(12) United States Patent
Tanaka et al.

(10) Patent No.: US 11,749,431 B2
(45) Date of Patent: Sep. 5, 2023

(54) ELECTRICAL STEEL SHEET, LAMINATED CORE, AND LAMINATED CORE MANUFACTURING METHOD

(71) Applicant: NIPPON STEEL CORPORATION, Tokyo (JP)

(72) Inventors: Ichiro Tanaka, Tokyo (JP); Kazutoshi Takeda, Tokyo (JP); Minako Fukuchi, Tokyo (JP); Shinsuke Takatani, Tokyo (JP); Shuichi Yamazaki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/795,432

(22) PCT Filed: Jun. 17, 2021

(86) PCT No.: PCT/JP2021/023030
§ 371 (c)(1),
(2) Date: Jul. 26, 2022

(87) PCT Pub. No.: WO2021/256534
PCT Pub. Date: Dec. 23, 2021

(65) Prior Publication Data
US 2023/0064468 A1    Mar. 2, 2023

(30) Foreign Application Priority Data

Jun. 17, 2020 (JP) .................. 2020-104245

(51) Int. Cl.
*H01F 1/18* (2006.01)
*H01F 41/02* (2006.01)
*B32B 15/01* (2006.01)

(52) U.S. Cl.
CPC ............. *H01F 1/18* (2013.01); *B32B 15/011* (2013.01); *H01F 41/0206* (2013.01)

(58) Field of Classification Search
CPC ....................................... H01F 1/18; C09J 5/04
See application file for complete search history.

(56) References Cited

U.S. PATENT DOCUMENTS

| | | | |
|---|---|---|---|
| 2005/0236913 | A1 | 10/2005 | Yoshimura et al. |
| 2019/0010567 | A1 | 1/2019 | Kim et al. |
| 2020/0086619 | A1 | 3/2020 | Nakagawa et al. |

(Continued)

FOREIGN PATENT DOCUMENTS

| | | |
|---|---|---|
| CN | 1526854 A | 9/2004 |
| JP | 2005-312219 A | 11/2005 |
| JP | 2017-186542 A | 10/2017 |

(Continued)

*Primary Examiner* — Adam Krupicka
(74) *Attorney, Agent, or Firm* — Birch, Stewart, Kolasch & Birch, LLP

(57) ABSTRACT

This electrical steel sheet includes a base steel sheet, a first insulation coating formed on a first surface of the base steel sheet and having adhesiveness, and a second insulation coating formed on a second surface of the base steel sheet which is a back surface to the first surface and having adhesiveness, in which an average pencil hardness of the first insulation coating is HB or higher and 3 H or lower, and an average pencil hardness of the second insulation coating is higher than the average pencil hardness of the first insulation coating.

12 Claims, 6 Drawing Sheets

(56) References Cited

U.S. PATENT DOCUMENTS

2021/0171813 A1  6/2021  Kaneko
2022/0041893 A1  2/2022  Ha et al.

FOREIGN PATENT DOCUMENTS

| JP | 2019-508573 A | 3/2019 | |
|----|---------------|--------|---|
| KR | 10-2020-0066509 A | 6/2020 | |
| WO | WO 2018/116881 A1 | 6/2018 | |
| WO | WO 2019/123885 A1 | 6/2019 | |
| WO | WO 2019/235264 A1 | 12/2019 | |
| WO | WO-2020111742 A2 * | 6/2020 | ........... B32B 15/011 |
| WO | WO 2021/256536 A1 | 12/2021 | |

* cited by examiner

ELECTRICAL STEEL SHEET, LAMINATED CORE, AND LAMINATED CORE MANUFACTURING METHOD

TECHNICAL FIELD

The present invention relates to an electrical steel sheet, a laminated core, and a laminated core manufacturing method.

Priority is claimed on Japanese Patent Application No. 2020-104245, filed Jun. 17, 2020, the content of which is incorporated herein by reference.

BACKGROUND ART

A laminated core in which a plurality of electrical steel sheets are laminated is used for a rotary electric machine. These electrical steel sheets are integrated in a laminated state by a method such as fastening, welding, adhering, or the like. However, when lamination is performed by fastening or welding, magnetic properties of each electrical steel sheet may deteriorate due to a mechanical stress or a thermal stress applied during processing, and furthermore interlayer short-circuiting, and performance of the laminated core may not be fully exhibited. Lamination by adhesion is extremely effective in solving this problem.

For example, the non-grain-oriented electrical steel sheet product disclosed in Patent Document 1 below employs a configuration in which it includes a plurality of non-grain-oriented electrical steel sheets and an adhesive coating layer positioned between the plurality of non-grain-oriented electrical steel sheets, the adhesive coating layer contains a first component containing an organic/inorganic complex and a second component containing a composite metal phosphate, the first component is contained in an amount of 70 to 99% by weight and the second component is contained in an amount of 1 to 30% by weight with respect to 100% by weight of a total amount of the adhesive coating layer, the organic/inorganic complex is obtained by chemically substituting inorganic nanoparticles with some functional groups in an organic resin, the organic resin is one or more selected from an epoxy-based resin, an ester-based resin, an acrylic-based resin, a styrene-based resin, a urethane-based resin, and an ethylene-based resin, and the inorganic nanoparticles are one or more selected from $SiO_2$, $Al_2O_3$, $TiO_2$, MgO, ZnO, and $ZrO_2$.

According to this configuration, it is explained that, even if a thickness of the adhesive coating layer is formed thin, characteristics such as weldability, heat resistance, adhesion before and after SRA, and a stacking factor can be improved while an excellent adhesiveness and insulating properties are exhibited.

Also, the electrical steel sheet disclosed in Patent Document 2 is an electrical steel sheet with an insulation coating having a heat-resistant adhesive insulation coating on one side or both sides thereof, and employs a configuration in which the heat-resistant adhesive insulation coating contains 70% by mass or more of a polyether urethane resin and 30 parts by mass or less of a silane compound with respect to 100 parts by mass of the polyether urethane resin.

According to this configuration, a high-temperature adhesiveness is required as in automobile motors.

CITATION LIST

Patent Document

[Patent Document 1]
Published Japanese Translation No. 2019-508573 of the PCT International Publication
[Patent Document 2]
Japanese Unexamined Patent Application, First Publication No. 2017-186542

SUMMARY OF THE INVENTION

Problems to be Solved by the Invention

An electrical steel sheet is required to combine both adhesiveness, and resistance to slitting and scratch prevention ability. However, in the above-described Patent Documents 1 and 2, while an adhesiveness after lamination is examined, a resistance to slitting and a scratch prevention ability are not examined at all.

Here, the adhesiveness means that an insulation coating is melted and exhibits adhesive properties when at least one of heating and pressurizing is applied. The adhesiveness increases as the insulation coating becomes softer.

On the other hand, the resistance to slitting means difficulty in scratching and peeling off of an insulation coating when front and back surfaces of an electrical steel sheet are rubbed by a pad that presses the electrical steel sheet for performing slit processing. Further, the "scratch prevention ability" means difficulty in being scratched when a back surface of a base steel sheet is rubbed during transfer of the base steel sheet between a plurality of molds. The resistance to slitting and the scratch prevention ability become higher as the insulation coating becomes harder.

As described above, the adhesiveness, and the resistance to slitting and scratch prevention ability are in a contradictory relationship with respect to the hardness of the insulation coating by which they are realized. That is, the adhesiveness is sacrificed when the hardness of the insulation coating is increased, and conversely, the resistance to slitting and the scratch prevention ability are impaired when the hardness of the insulation coating is decreased.

The present invention has been made in view of the above circumstances and is directed to providing an electrical steel sheet in which both high adhesiveness, and high resistance to slitting and scratch prevention ability can be achieved, a laminated core formed by laminating a plurality of these electrical steel sheets, and a laminated core manufacturing method for manufacturing the laminated core.

[Means for Solving the Problem]

In order to solve the above-described problems and achieve the objective, the present invention employs the following aspects.

(1) An electrical steel sheet according to one aspect of the present invention includes a base steel sheet, a first insulation coating formed on a first surface of the base steel sheet and having adhesiveness, and a second insulation coating formed on a second surface of the base steel sheet which is a back surface to the first surface and having adhesiveness, in which an average pencil hardness of the first insulation coating is HB or higher and 3H or lower, and an average pencil hardness of the second insulation coating is higher than the average pencil hardness of the first insulation coating.

According to the electrical steel sheet of the above-described (1), roles are differently assigned to front and back surfaces of the base steel sheet by making a change in hardness therebetween. Specifically, since the second surface side is covered with the second insulation coating that is relatively hard, a high resistance to slitting and scratch prevention ability can be exhibited. On the other hand, since the first surface side is covered with the first insulation coating that is relatively soft and has an average pencil hardness of HB or higher, a relatively high adhesive strength can be exhibited while a necessary and sufficient resistance to slitting and scratch prevention ability are secured.

Specifically, an adhesiveness of the first insulation coating and an adhesiveness of the second insulation coating are exhibited when the first insulation coating and the second insulation coating are melted by receiving at least one of heating and pressurizing in a state in which a plurality of electrical steel sheets are laminated, and the first insulation coating and the second insulation coating overlap each other. Here, since the adhesiveness of the first insulation coating is higher than that of the second insulation coating, an adhesive strength between the electrical steel sheets when the laminated core is formed is mainly secured by the adhesiveness of the first insulation coating. Here, if the adhesive strength described in a first example to be described later is used as an example, the adhesiveness of the first insulation coating required for forming the laminated core is 980 N or more.

As described above, according to the electrical steel sheet of the present aspect, both adhesiveness for forming the laminated core, and high resistance to slitting and scratch prevention ability can be achieved.

(2) In the electrical steel sheet of the above-described (1), the average pencil hardness of the second insulation coating may be 4 H or higher and 9 H or lower.

According to the electrical steel sheet of the above-described (2), both the resistance to slitting and scratch prevention ability on the second surface, and the adhesive strength on the first surface can be more reliably achieved.

(3) In the electrical steel sheet of the above-described (1) or (2), the following configuration may be employed. The first insulation coating and the second insulation coating both contain the same main agent and the same curing agent, and, when an equivalent ratio of the curing agent to the main agent in the first insulation coating is a and an equivalent ratio of the curing agent to the main agent in the second insulation coating is b, a relative ratio expressed by a/b is 0.60 or more and 0.95 or less.

According to the electrical steel sheet of the above-described (3), both the resistance to slitting and scratch prevention ability on the second surface, and the adhesive strength on the first surface can be more reliably achieved.

(4) A laminated core according to one aspect of the present invention is formed by laminating two or more electrical steel sheets according to any one of the above-described (1) to (3).

According to the laminated core of the above-described (4), since the laminated core is manufactured by using the electrical steel sheet in which both necessary and sufficient adhesive strength, and high resistance to slitting and scratch prevention ability can be achieved, a rigidity is high and a yield is satisfactory.

(5) A laminated core manufacturing method according to one aspect of the present invention includes a punching step of obtaining a plurality of electrical steel sheets according to any one of the above-described (1) to (3) by punching a material while intermittently conveying the material in a conveying direction, and a laminating step of laminating each of the electrical steel sheets, in which the material includes the base steel sheet, the first insulation coating formed on an upper surface of the base steel sheet, and the second insulation coating formed on a lower surface of the base steel sheet, the material is conveyed with the second insulation coating facing downward in the punching step, and each electrical steel sheet is laminated so that the second insulation coating of the electrical steel sheet to be laminated later overlaps the first insulation coating of the electrical steel sheet laminated previously in the laminating step.

According to the laminated core manufacturing method of the above-described (5), in the punching step, the material is conveyed while the second insulation coating, which has a relatively high average pencil hardness, faces downward. Therefore, since scratches on the material during conveyance can be prevented, a robust laminated core can be manufactured using the electrical steel sheet having less scratches and dusting.

[Effects of the Invention]

According to the above-described aspects of the present invention, it is possible to provide the electrical steel sheet in which both high adhesiveness, and high resistance to slitting and scratch prevention ability can be achieved, the laminated core formed by laminating a plurality of these electrical steel sheets, and the laminated core manufacturing method for manufacturing the laminated core.

EMBODIMENTS FOR IMPLEMENTING THE INVENTION

Hereinafter, a laminated core according to one embodiment of the present invention, a rotary electric machine including the laminated core, and a material (electrical steel sheet) forming the laminated core will be described with reference to the drawings. Further, in the present embodiment, an electric motor, specifically an AC electric motor, more specifically a synchronous electric motor, and even more specifically a permanent magnetic electric motor will be described as one example of the rotary electric machine. An electric motor of this type is suitably employed for, for example, electric automobiles.

(Rotary Electric Machine 10)

Figure 1:
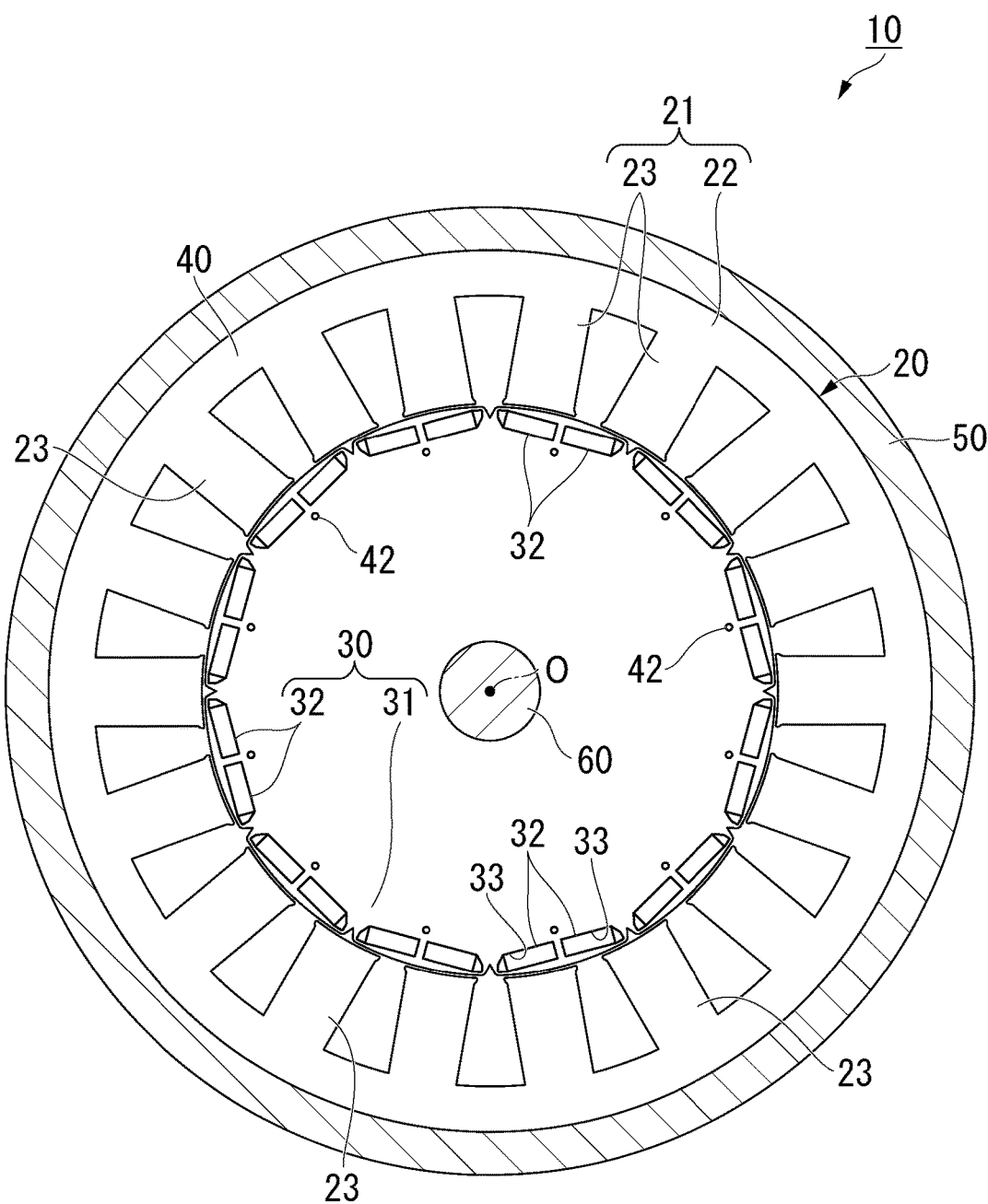
FIG. 1 is a cross-sectional view of a rotary electric machine including a laminated core according to one embodiment of the present invention.

As illustrated in FIG. 1, the rotary electric machine 10 includes a stator 20, a rotor 30, a case 50, and a rotating shaft 60. The stator 20 and rotor 30 are housed in the case 50. The stator 20 is fixed in the case 50.

In the present embodiment, an inner rotor type in which the rotor 30 is positioned on a radially inner side of the stator 20 is employed as the rotary electric machine 10. However, an outer rotor type in which the rotor 30 is positioned on an outer side of the stator 20 may also be employed as the rotary electric machine 10. Also, in the present embodiment, the rotary electric machine 10 is a 12-pole 18-slot three-phase AC motor. However, the number of poles, the number of slots, the number of phases, or the like can be changed as appropriate.

The rotary electric machine 10 can rotate at a rotation speed of 1000 rpm by applying, for example, an excitation current having an effective value of 10 A and a frequency of 100 Hz to each phase.

The stator 20 includes a laminated core for a stator (hereinafter referred to as a stator core) 21 and a winding (not illustrated).

A plurality of electrical steel sheets 40 constituting the stator core 21 each include an annular core back part 22 and a plurality of tooth parts 23. Hereinafter, a central axis O direction of the stator core 21 (or the core back part 22) is referred to as an axial direction, a radial direction (a direction perpendicular to the central axis O) of the stator core 21 (or the core back part 22) is referred to as a radial direction, and a circumferential direction (a direction revolving around the central axis O) of the stator core 21 (or the core back part 22) is referred to as a circumferential direction.

The core back part 22 is formed in an annular shape in a plan view of the stator 20 from the axial direction.

The plurality of tooth parts 23 protrude inward in the radial direction (toward the central axis O of the core back part 22 in the radial direction) from an inner circumference of the core back part 22. The plurality of tooth parts 23 are disposed at equiangular angle intervals in the circumferential direction. In the present embodiment, 18 tooth parts 23 are provided every 20 degrees in terms of the central angle with the central axis O as a center. The plurality of tooth parts 23 are formed to have the same shape and the same size as each other. Therefore, the plurality of tooth parts 23 have the same thickness dimension as each other.

The winding is wound around each of the tooth parts 23. The winding may be a concentrated winding or a distributed winding.

The rotor 30 is disposed on a radially inner side with respect to the stator 20 (the stator core 21). The rotor 30 includes a rotor core 31 and a plurality of permanent magnets 32.

The rotor core 31 is formed in a ring shape (annular shape) disposed coaxially with the stator 20. The rotating shaft 60 is disposed in the rotor core 31. The rotating shaft 60 is fixed to the rotor core 31.

The plurality of permanent magnets 32 are fixed to the rotor core 31. In the present embodiment, a set of two permanent magnets 32 forms one magnetic pole. The plurality of sets of permanent magnets 32 are disposed at equiangular angle intervals in the circumferential direction. In the present embodiment, 12 sets (24 in total) of the permanent magnets 32 are provided every 30 degrees in terms of the central angle with the central axis O as a center.

In the present embodiment, an interior permanent magnet motor is employed as the permanent magnetic electric motor. A plurality of through holes 33 penetrating the rotor core 31 in the axial direction are formed in the rotor core 31. The plurality of through holes 33 are provided to correspond to a disposition of the plurality of permanent magnets 32. The permanent magnets 32 are each fixed to the rotor core 31 in a state of being disposed in the corresponding through hole 33. Fixing of each permanent magnet 32 to the rotor core 31 can be realized, for example, by causing an outer surface of the permanent magnet 32 and an inner surface of the through hole 33 to be adhered to each other using an adhesive. Further, a surface permanent magnet motor may be employed as the permanent magnetic electric motor instead of an interior permanent magnet motor.

Figure 2:
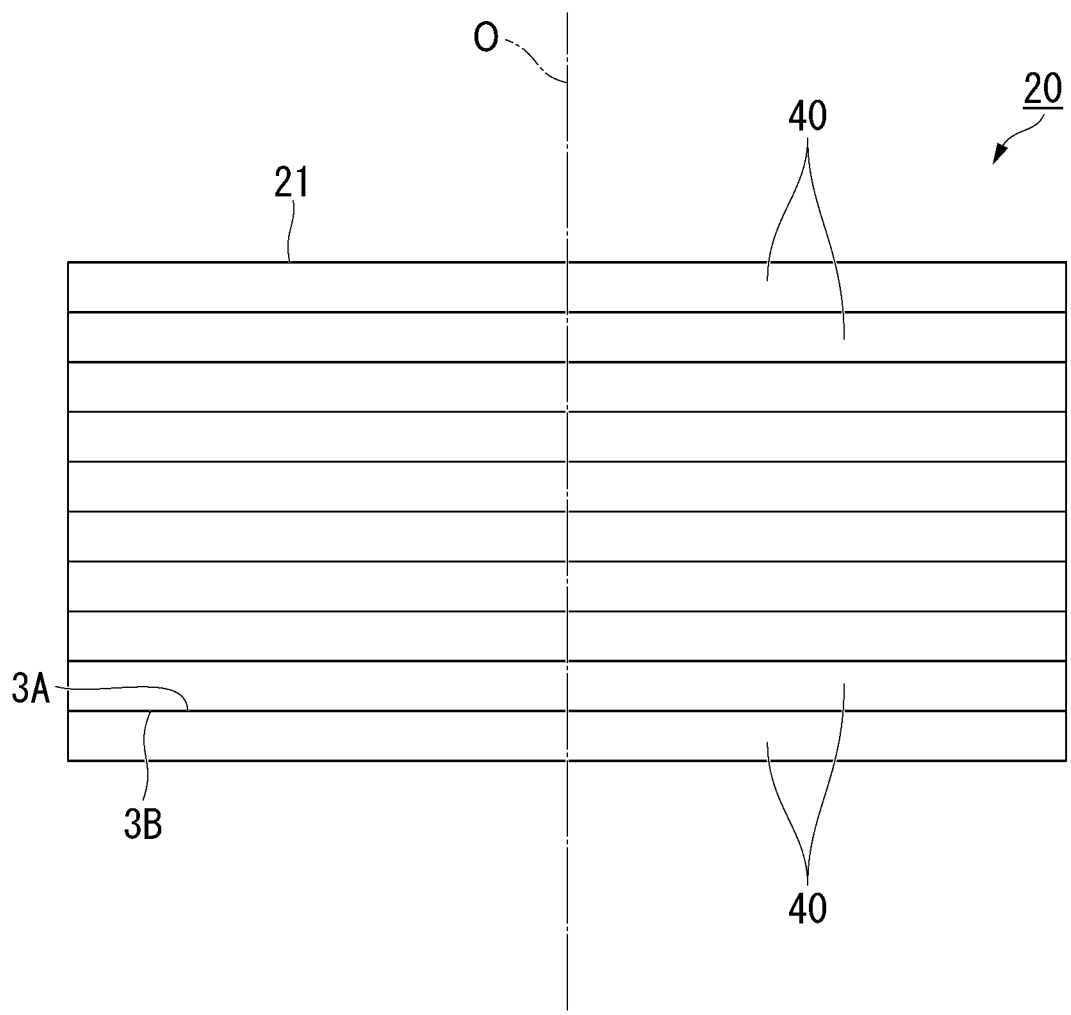
FIG. 2 is a side view of the laminated core.

Both the stator core 21 and the rotor core 31 are laminated cores. As illustrated in FIG. 2, the stator core 21 is formed by, for example, laminating the plurality of electrical steel sheets 40 in a lamination direction. Further, the lamination direction is the axial direction.

Laminated thicknesses (entire length along the central axis O) of the stator core 21 and the rotor core 31 are each, for example, 50.0 mm. An outer diameter of the stator core 21 is, for example, 250.0 mm. An inner diameter of the stator core 21 is, for example, 165.0 mm. An outer diameter of the rotor core 31 is, for example, 163.0 mm. An inner diameter of the rotor core 31 is, for example, 30.0 mm. However, these values are an example, and the laminated thickness, the outer diameter, and the inner diameter of the stator core 21, and the laminated thickness, the outer diameter, and the inner diameter of the rotor core 31 are not limited only to these values. Here, a distal end portion of the tooth part 23 of the stator core 21 is used as a reference for the inner diameter of the stator core 21. That is, the inner diameter of the stator core 21 is a diameter of a virtual circle inscribed in the distal end portions of all the tooth parts 23.

Figure 3:
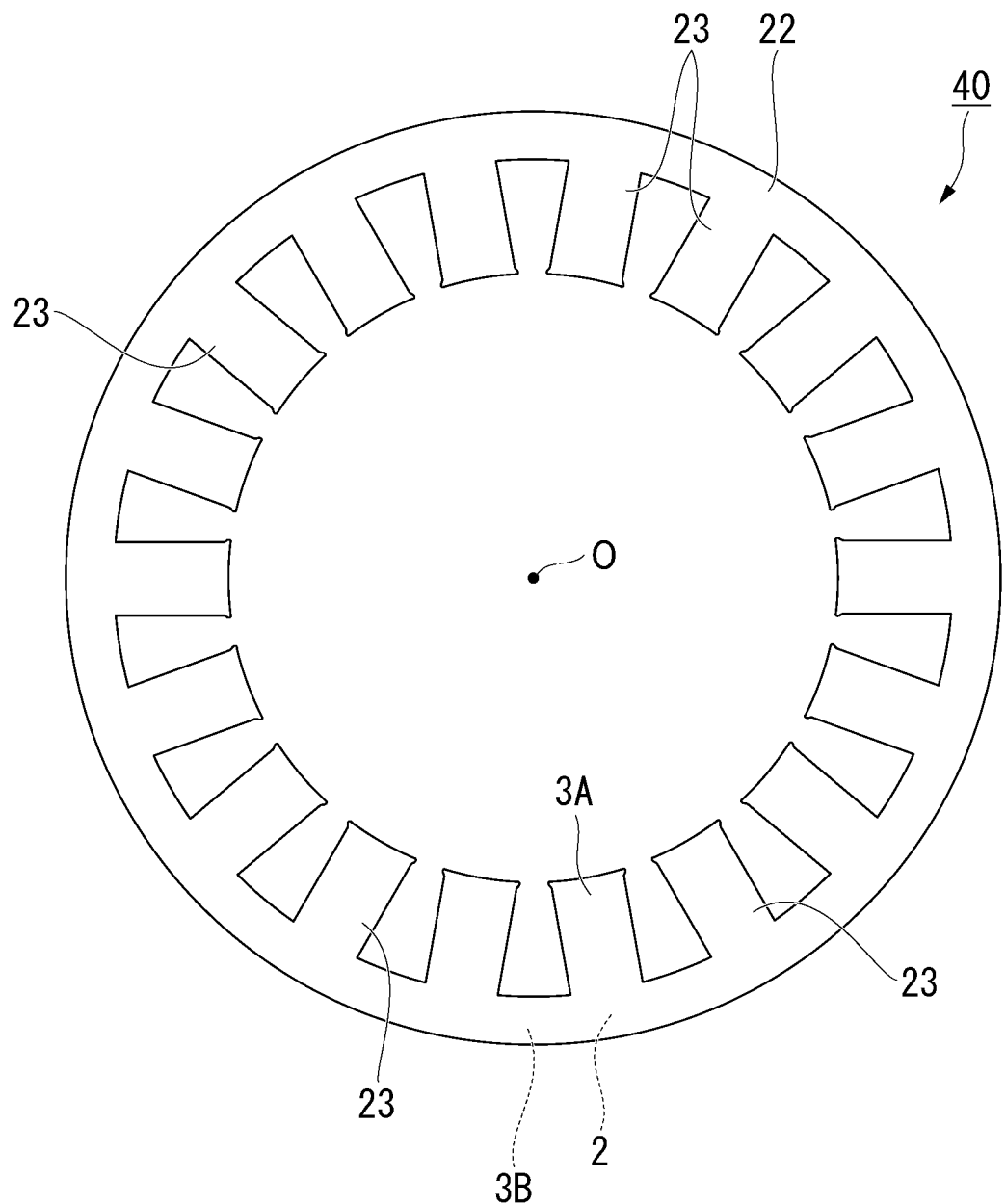
FIG. 3 is a plan view of an electrical steel sheet constituting the laminated core.
Figure 5:
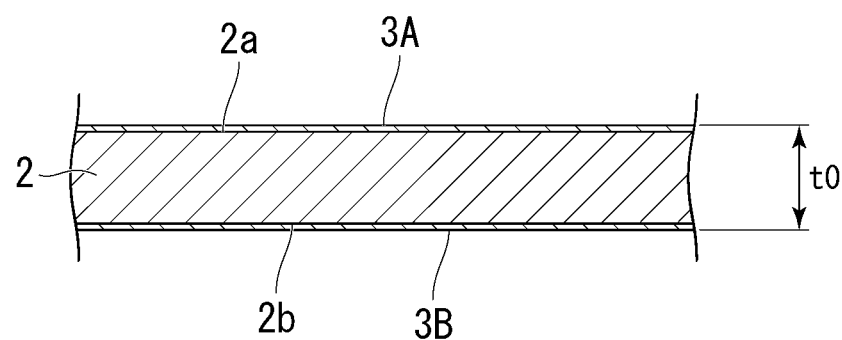
FIG. 5 is a view illustrating the material and is a cross-sectional view along a line A-A of a B portion in FIG. 4.

FIG. 3 illustrates one of the plurality of electrical steel sheets 40 constituting the stator core 21. The electrical steel sheet 40 includes, as shown in FIG. 5, a base steel sheet 2, a first insulation coating 3A formed on a first surface 2a which is a front surface of the base steel sheet 2 and having adhesiveness, and a second insulation coating 3B formed on a second surface 2b which is a back surface of the base steel sheet 2 and having adhesiveness. Further, a disposition relationship between the first insulation coating 3A, the base steel sheet 2, and the second insulation coating 3B is the same as that of a material 1 to be described later, and specifically has the same disposition configuration as that of FIG. 5 to be described later.

Further, "having adhesiveness" described above means that the first insulation coating 3A and the second insulation coating 3B are melted and exhibit adhesive properties when at least one of pressurizing and heating is applied.

An average pencil hardness of the second insulation coating 3B is higher than an average pencil hardness of the first insulation coating 3A. The average pencil hardness of the first insulation coating 3A is HB or higher and 3H or lower. The average pencil hardness can be obtained by a scratch hardness (pencil method) described in JIS K5400 5-4.

The first insulation coating 3A is formed on an upper surface of the core back part 22 and an upper surface of each tooth part 23. The second insulation coating 3B is formed on a lower surface of the core back part 22 and a lower surface of each tooth part 23. At least a part of a side surface of the core back part 22 may be covered with at least one of the first insulation coating 3A and the second insulation coating 3B. Similarly, at least a part of a side surface of each tooth part 23 may be covered with at least one of the first insulation coating 3A and the second insulation coating 3B. The side surface referred to herein is a cut surface formed after punching when the electrical steel sheet 40 is formed by punching from the material 1 to be described later, and includes a side surface on an outer circumferential side forming an outer shape of the core back part 22 and a side surface forming an outer shape of the tooth part 23 and an inner shape of the core back part 22.

Figure 4:
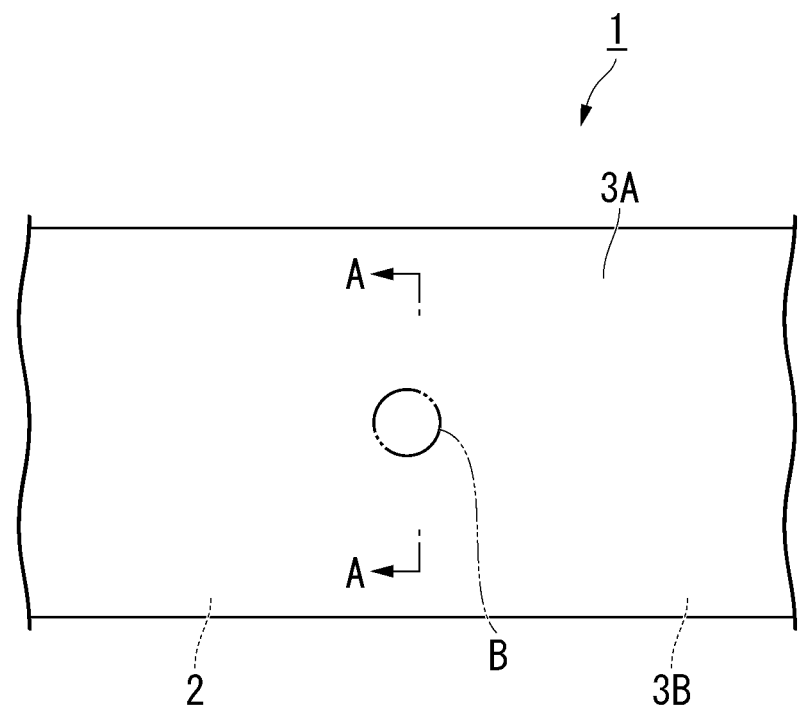
FIG. 4 is a plan view of a strip-shaped steel sheet which is a material of the electrical steel sheet.

Each electrical steel sheet 40 is formed by punching or the like of the material 1 illustrated in FIGS. 4 and 5. The material 1 is a steel sheet (electrical steel sheet) serving as a base material of the electrical steel sheet 40. As the material 1, a strip-shaped steel sheet, a cut sheet, or the like can be used.

Although it is in the middle of description on the stator core 21, the material 1 will be described below. Further, in the present specification, a strip-shaped steel sheet serving as the base material of the electrical steel sheet 40 may be referred to as the material 1. A steel sheet obtained by punching the material 1 into a shape used for the laminated core may be referred to as the electrical steel sheet 40.

(Material 1)

Figure 6:
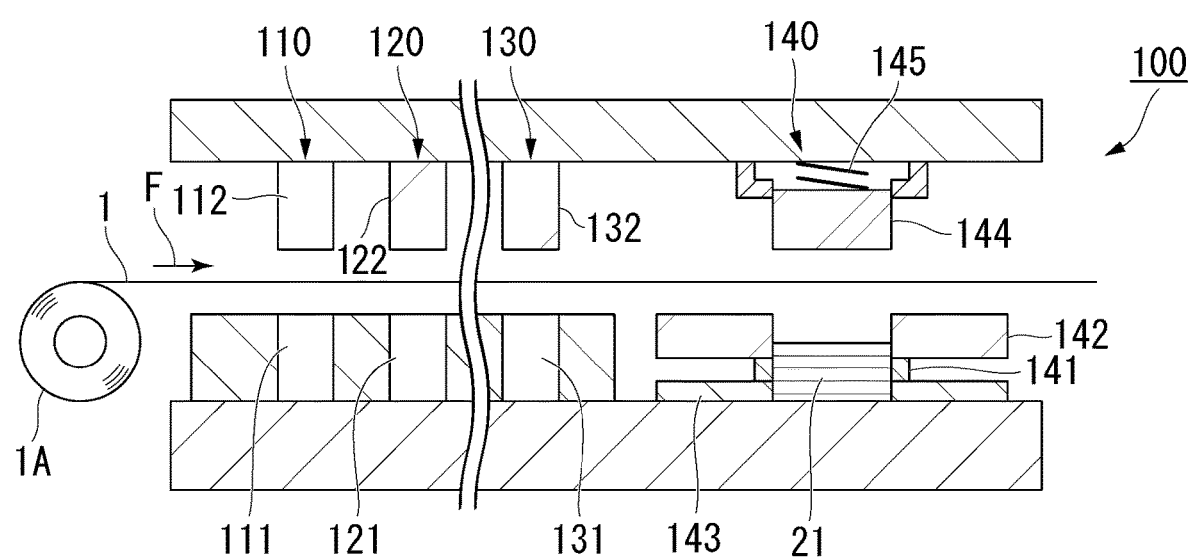
FIG. 6 is a side view illustrating an example of a manufacturing device which obtains an electrical steel sheet from the material and manufactures the laminated core.

When the material 1 is a strip-shaped steel sheet, the material 1 is handled, for example, in a state of being wound around a coil 1A (see FIG. 6). In the present embodiment, a non-grain-oriented electrical steel sheet is employed as the material 1. A non-grain-oriented electrical steel strip of JIS C 2552:2014 can be employed as the non-grain-oriented electrical steel sheet. However, a grain-oriented electrical steel sheet may also be employed as the material 1 instead of a non-grain-oriented electrical steel sheet. As the grain-oriented electrical steel sheet in this case, a grain-oriented electrical steel strip of JIS C 2553:2019 can be employed. Also, as the material 1, a non-grain-oriented thin electrical steel strip or a grain-oriented thin electrical steel strip of JIS C 2558:2015 can also be employed.

Upper and lower limit values of an average sheet thickness $t0$ of the material 1 are set, for example, as follows.

As a sheet thickness of the material 1 decreases, a manufacturing cost of the material 1 increases. Therefore, a lower limit value of the average sheet thickness $t0$ of the material 1 is 0.10 mm, preferably 0.15 mm, and more preferably 0.18 mm when considering the manufacturing cost.

On the other hand, if the material 1 is too thick, the manufacturing cost becomes satisfactory, but when the material 1 is used as the electrical steel sheet 40, eddy current loss increases and core iron loss deteriorates. Therefore, an upper limit value of the average sheet thickness $t0$ of the material 1 is 0.65 mm, preferably 0.35 mm, and more preferably 0.30 mm when the core iron loss and the manufacturing cost are considered.

As the material 1 satisfying the above-described range of the average sheet thickness $t0$, 0.20 mm can be exemplified.

Further, the average sheet thickness $t0$ of the material 1 includes not only a thickness of the base steel sheet 2 to be described later but also thicknesses of the first insulation coating 3A and the second insulation coating 3B. Also, a method of measuring the average sheet thickness $t0$ of the material 1 is performed by, for example, the following measurement method. For example, when the material 1 is a strip-shaped steel sheet wound in a shape of the coil 1A (see FIG. 6), at least a part of the material 1 is unwound into a flat sheet shape. In the material 1 unwound into a flat plate shape, a predetermined position of the material 1 in a longitudinal direction (for example, a position away from an end edge of the material 1 in the longitudinal direction by a length of 10% of an entire length of the material 1) is selected. At the selected position, the material 1 is divided into five regions in a width direction thereof. A sheet thickness of the material 1 is measured at four positions that are boundaries of those five regions. An average value of the sheet thicknesses at the four positions can be used as the average sheet thickness $t0$ of the material 1.

The upper and lower limit values of the average sheet thickness $t0$ of the material 1 can also be employed as upper and lower limit values of the average sheet thickness $t0$ of the electrical steel sheet 40. Further, a method of measuring the average sheet thickness $t0$ of the electrical steel sheet 40 is performed by, for example, the following measurement method. For example, a laminated thickness of the laminated core is measured at four positions at equal intervals in the circumferential direction (that is, every 90 degrees with the central axis O as a center). Each of the measured laminated thicknesses at the four positions is divided by the number of laminated electrical steel sheets 40 to calculate a sheet thickness per sheet. An average value of the sheet thicknesses at the four positions can be used as the average sheet thickness $t0$ of the electrical steel sheet 40. The average sheet thickness $t0$ measured in a state of the electrical steel sheet 40 is equal to the average sheet thickness $t0$ measured in a state of the material 1.

As illustrated in FIGS. 4 and 5, the material 1 includes the base steel sheet 2, the first insulation coating 3A formed on the first surface 2a which is a front surface of the base steel sheet 2 and having adhesiveness, and the second insulation coating 3B formed on the second surface 2b which is a back surface of the base steel sheet 2 and having adhesiveness. An average pencil hardness of the second insulation coating 3B is higher than an average pencil hardness of the first insulation coating 3A. The average pencil hardness of the first insulation coating 3A is HB or higher and 3 H or lower. The average pencil hardness of the first insulation coating 3A can also be obtained by the scratch hardness (pencil method) described in JIS K5400 5-4 similarly to the second insulation coating 3B.

A chemical composition of the base steel sheet 2 contains 2.5% to 4.5% of Si in units of % by mass as shown below. When the chemical composition is within this range, a yield strength of the material 1 (electrical steel sheet 40) can be set to, for example, 380 MPa or more and 540 MPa or less.

Si: 2.5% to 4.5%

Al: 0.001% to 3.0%

Mn: 0.05% to 5.0%

Remainder: Fe and Impurities

When the material 1 is used as the electrical steel sheet 40, both the first insulation coating 3A and the second insulation coating 3B exhibit insulation performance between the electrical steel sheets 40 adjacent to each other in the lamination direction. Also, both the first insulation coating 3A and the second insulation coating 3B have adhesiveness (self-adhesion function) and adhere the electrical steel sheets 40 adjacent to each other in the lamination direction. More specifically, both the first insulation coating 3A and the second insulation coating 3B are fused by being subjected to at least one of pressurizing and heating or the like.

On the other hand, functions of the first insulation coating 3A and the second insulation coating 3B are different from each other.

That is, an average pencil hardness of the second insulation coating 3B is set to be high to secure resistance to slitting and scratch prevention ability. Further, the "resistance to slitting" means difficulty in scratching and peeling off of the first insulation coating 3A and the second insulation coating 3B when front and back surfaces of the electrical steel sheet 40 are rubbed by a pad (not illustrated) that presses the electrical steel sheet 40 for performing slit processing. Further, the "scratch prevention ability" means difficulty in being scratched when the second insulation coating 3B forming the back surface (lower surface) of the material 1 is rubbed during transfer of the material 1 between molds. The resistance to slitting and the scratch prevention ability become higher as the second insulation coating 3B is harder. A degree of damage to the second insulation coating 3B can be evaluated by pressing the material 1 against a steel sheet support roll of the factory line and rubbing them against each other, and visually determining a degree of damage received by the second insulation coating 3B at that time.

The resistance to slitting and the scratch prevention ability of the second insulation coating 3B are characteristics already required from the time before the electrical steel sheets 40 are laminated. On the other hand, softness required for the first insulation coating 3A is a characteristic required when the electrical steel sheet 40 is bonded by pressurizing and heating after the electrical steel sheets 40 are laminated.

When the average pencil hardness is increased, an insufficient adhesive strength occurs when the laminated core is manufactured by laminating the electrical steel sheets 40. Therefore, in order to make up for the insufficient adhesive strength, the average pencil hardness is lowered in the first insulation coating 3A to make it softer. Specifically, the average pencil hardness of the first insulation coating 3A is HB or higher and 3 H or lower. On the other hand, the average pencil hardness of the second insulation coating 3B is 4 H or higher and 9 H or lower. At any combination in average pencil hardness of the first insulation coating 3A and the second insulation coating 3B, the second insulation coating 3B has a relatively higher average pencil hardness and is harder than the first insulation coating 3A. Conversely, the first insulation coating 3A has a relatively lower average pencil hardness and is softer than the second insulation coating 3B.

The first insulation coating 3A and the second insulation coating 3B may each have a single-layer configuration or a multilayer configuration. More specifically, the first insulation coating 3A and the second insulation coating 3B may each have a single-layer configuration having both insulation performance and adhesiveness. Alternatively, the first insulation coating 3A and the second insulation coating 3B may each have a multilayer configuration including an underlying insulation coating having excellent insulation performance and an upper insulation coating having excellent adhesive performance. In this case, the underlying insulation coating is formed to cover a surface of the base steel sheet 2 without gaps, and the upper insulation coating is formed to overlap a surface of the underlying insulation coating. In a case of this multilayer configuration, an upper insulation coating formed on an outermost surface (uppermost surface) of the electrical steel sheet 40 has an average pencil hardness required for the first insulation coating 3A. Similarly, an upper insulation coating formed on a most back side surface (lowermost surface) of the electrical steel sheet 40 has an average pencil hardness required for the second insulation coating 3B. That is, the average pencil hardness of the upper insulation coating formed on the outermost surface (uppermost surface) of the electrical steel sheet 40 is HB or higher and 3 H or lower. Also, the average pencil hardness of the upper insulation coating formed on the most back side surface (lowermost surface) of the electrical steel sheet 40 is higher than the average pencil hardness of the upper insulation coating formed on the outermost surface (uppermost surface) of the electrical steel sheet 40.

In a range in which insulation performance and adhesiveness are secured, the underlying insulation coating may not cover both surfaces of the base steel sheet 2 without gaps. In other words, a part of the underlying insulation coating may be intermittently provided on the surface of the base steel sheet 2. However, in order to secure the insulation performance, both surfaces of the base steel sheet 2 are preferably covered with the underlying insulation coating so that the entire surface thereof is not exposed.

A coating composition for forming the underlying insulation coating is not particularly limited, and for example, a general treatment agent such as a chromic acid-containing treatment agent or a phosphate-containing treatment agent can be utilized.

The first insulation coating 3A and the second insulation coating 3B are formed by applying a coating composition for an electrical steel sheet onto the base steel sheet 2. The first insulation coating 3A and the second insulation coating 3B are in an uncured or semi-cured state (B stage) before pressurizing and heating during manufacture of the laminated core, and exhibit an adhesiveness when a curing reaction proceeds due to heating during the pressurizing and heating.

The coating composition for an electrical steel sheet is not particularly limited, and, for example, a composition containing an epoxy resin and an epoxy resin curing agent can be exemplified. That is, as an example of the insulation coating having adhesiveness, a coating containing an epoxy resin and an epoxy resin curing agent can be exemplified.

As the epoxy resin, a general epoxy resin can be utilized, and specifically, any epoxy resin having two or more epoxy groups in one molecule can be utilized without particular limitation. As such epoxy resins, for example, a bisphenol A type epoxy resin, a bisphenol F type epoxy resin, a phenol novolac type epoxy resin, a cresol novolac type epoxy resin, an alicyclic epoxy resin, a glycidyl ester type epoxy resin, a glycidyl amine type epoxy resin, a hydantoin type epoxy resin, an isocyanurate type epoxy resin, an acrylic acid modified epoxy resin (epoxy acrylate), a phosphorus-containing epoxy resin, halides (brominated epoxy resin and the like) or hydrogen additives thereof, and the like can be exemplified. As the epoxy resin, one type may be used alone, or two or more types may be used together.

The coating composition for an electrical steel sheet may contain an acrylic resin.

The acrylic resin is not particularly limited. As monomers used for the acrylic resin, for example, unsaturated carboxylic acids such as acrylic acid and methacrylic acid, and (meth) acrylates such as methyl (meth) acrylate, ethyl (meth) acrylate, n-butyl (meth) acrylate, isobutyl (meth) acrylate, cyclohexyl (meth) acrylate, 2-ethylhexyl (meth) acrylate, 2-hydroxyethyl (meth) acrylate, and hydroxypropyl (meth) acrylate can be exemplified. Further, the (meth) acrylate means acrylate or methacrylate. As the acrylic resin, one type may be used alone, or two or more types may be used together.

The acrylic resin may have structural units derived from other monomers other than an acrylic monomer. As other monomers, for example, ethylene, propylene, styrene, and the like can be exemplified. As other monomers, one type may be used alone, or two or more types may be used together.

When an acrylic resin is used, it may be used as an acrylic modified epoxy resin in which the acrylic resin is grafted to an epoxy resin. In the coating composition for an electrical steel sheet, it may be contained as monomers forming an acrylic resin.

As the epoxy resin curing agent, a thermosetting type having potential can be utilized, and for example, aromatic polyamine, acid anhydride, a phenol-based curing agent, dicyandiamide, boron trifluoride-amine complex, organic acid hydrazide, and the like can be exemplified. As the aromatic polyamine, for example, meta-phenylenediamine, diaminodiphenyl methane, diaminodiphenylsulfone, and the like can be exemplified. As the phenol-based curing agent, for example, a phenol novolac resin, a cresol novolak resin, a bisphenol novolak resin, a triazine-modified phenol novolak resin, a phenol resol resin, and the like can be exemplified. Of these, as the epoxy resin curing agent, a phenol-based curing agent is preferable, and a phenol resol resin is more preferable. As the epoxy resin curing agent, one type may be used alone, or two or more types may be used together.

A content of the epoxy resin curing agent in the coating composition for an electrical steel sheet is preferably 5 to 35 parts by mass, and more preferably 10 to 30 parts by mass with respect to 100 parts by mass of the epoxy resin.

The coating composition for an electrical steel sheet may be compounded with additives such as a curing accelerator (curing catalyst), an emulsifying agent, and an antifoaming agent. As the additive, only one type may be used, or two or more types may be used together.

As a means for providing a difference of the average pencil hardness described above between the first insulation coating 3A and the second insulation coating 3B by compounding a main agent and a curing agent, any of the following configurations A to C alone or a combination thereof can be employed.

Configuration A

In this configuration A, a combination of the main agent and the curing agent contained in the first insulation coating 3A and a combination of the main agent and the curing agent contained in the second insulation coating 3B are different from each other.

Configuration B

In this configuration B, the first insulation coating 3A and the second insulation coating 3B both contain a combination of the same main agent and the same curing agent. However, a compounding ratio of the main agent and curing agent is different between the first insulation coating 3A and the second insulation coating 3B. When an equivalent ratio of the curing agent to the main agent in the first insulation coating is a, and an equivalent ratio of the curing agent to the main agent in the second insulation coating is b, a relative ratio expressed by a/b is 0.60 or more and 0.95 or less.

Configuration C

In this configuration C, the first insulation coating 3A and the second insulation coating 3B both contain a combination of the same main agent and the same curing agent. Also, a compounding amount of the main agent is the same between the first insulation coating 3A and the second insulation coating 3B, and a compounding amount of the curing agent is also the same therebetween.

However, a combination of a baking temperature and a baking time is different between the first insulation coating 3A and the second insulation coating 3B. That is, even if the baking temperature is the same, when the baking time is increased, the average pencil hardness becomes higher (harder). Similarly, even if the baking time is the same, when the baking temperature is increased, the average pencil hardness becomes higher (harder). Therefore, the baking temperature of the second insulation coating 3B is made higher than that of the first insulation coating 3A, or the baking time of the second insulation coating 3B is made longer than that of the first insulation coating 3A, or both the baking temperature and the baking time of the second insulation coating 3B are made higher/longer than those of the first insulation coating 3A. Thereby, a difference of the average pencil hardness described above can be provided.

In any of the configurations A to C described above, since the second surface 2b side of the base steel sheet 2 is covered with the relatively hard second insulation coating 3B, a high resistance to dusting and resistance to slitting are exhibited. On the other hand, since the first surface 2a side is covered with the relatively soft first insulation coating 3A, a necessary and sufficient adhesive strength is secured. Therefore, both adhesiveness for forming the laminated core, and high resistance to dusting and resistance to slitting can be achieved.

Upper and lower limit values of an average thickness t1 of each of the first insulation coating 3A and the second insulation coating 3B are set, for example, as follows. Further, the average thicknesses t1 may be the same or different between the first insulation coating 3A and the second insulation coating 3B.

When the material 1 is used as the electrical steel sheet 40, the average thickness t1 (thickness per one surface of the electrical steel sheet 40 (the material 1)) of each of the first insulation coating 3A and the second insulation coating 3B is adjusted so that insulation performance and adhesiveness can be secured between the electrical steel sheets 40 laminated with each other.

When the first insulation coating 3A and the second insulation coating 3B each have a single-layer configuration, the average thickness t1 (thickness per one surface of the electrical steel sheet 40 (the material 1)) thereof can be, for example, 1.5 µm or more and 8.0 µm or less.

On the other hand, when the first insulation coating 3A and the second insulation coating 3B each have a multilayer configuration, an average thickness of the underlying insulation coating can be, for example, 0.3 µm or more and 1.2 µm or less. The average thickness of an underlying insulation coating 3b is preferably 0.7 µm or more and 0.9 µm or less. An average thickness of each adhesive portion 3a forming an upper insulation coating can be, for example, 1.5 µm or more and 8.0 µm or less.

Further, a method of measuring the average thickness t1 of each of the first insulation coating 3A and the second insulation coating 3B of the material 1 is the same as that of measuring the average sheet thickness t0 of the material 1, and the average thickness t1 can be obtained by, for example, obtaining thicknesses at 10 points and averaging the thicknesses.

The upper and lower limit values of the average thickness t1 of each of the first insulation coating 3A and the second insulation coating 3B on the material 1 can also be employed as upper and lower limit values of the average thickness t1 of each of the first insulation coating 3A and the second insulation coating 3B on the electrical steel sheet 40. Further, a method of measuring the average thickness t1 of each of the first insulation coating 3A and the second insulation coating 3B on the electrical steel sheet 40 is performed by, for example, the following measurement method. For example, among the plurality of electrical steel sheets 40 forming the laminated core, the electrical steel sheet 40 positioned on an outermost side in the lamination direction (the electrical steel sheet 40 whose surface is exposed in the lamination direction) is selected. On a front surface of the selected electrical steel sheet 40, a predetermined position in the radial direction (for example, a position that is exactly intermediate (center) between an inner circumferential edge and an outer circumferential edge of the electrical steel sheet 40) is selected. At the selected position, for example, thicknesses of 10 points are obtained. This is measured at each of four positions at equal intervals in the circumferential direction (that is, every 90 degrees with the central axis O as a center) of the electrical steel sheet 40. An average value of the measured thicknesses at the four positions can be used as the average thickness t1 of each of the first insulation coating 3A and the second insulation coating 3B.

Further, the reason why the average thickness t1 of each of the first insulation coating 3A and the second insulation coating 3B is measured on the electrical steel sheet 40 positioned on the outermost side in the lamination direction as described above is that the first insulation coating 3A and the second insulation coating 3B are made so that the thicknesses of the first insulation coating 3A and the second insulation coating 3B hardly change throughout laminated positions in the lamination direction of the electrical steel sheets 40.

The plurality of electrical steel sheets 40 are manufactured by punching the material 1 as described above a plurality of times, and the laminated core (the stator core 21 or the rotor core 31) is manufactured by laminating these electrical steel sheets 40. According to the laminated core, since the laminated core is manufactured by using the electrical steel sheet 40 in which both necessary and sufficient adhesive strength, and high resistance to dusting and resistance to slitting can be achieved, a rigidity is high and a yield is satisfactory.

(Laminating Method of Laminated Core)

Hereinafter, the description returns to the laminated core. As illustrated in FIG. 2, the plurality of electrical steel sheets 40 forming the stator core 21 are laminated with the first insulation coating 3A and the second insulation coating 3B interposed therebetween.

The electrical steel sheets 40 adjacent to each other in the lamination direction are adhered over the entire surface mainly by an adhesiveness of the first insulation coating 3A. In other words, a front surface of the electrical steel sheet 40 facing in the lamination direction (hereinafter referred to as a first surface) is an adhesion region over the entire surface. However, the electrical steel sheets 40 adjacent to each other in the lamination direction may not be adhered over the entire surface. In other words, an adhesion region and a non-adhesion region may coexist on the first surface of the electrical steel sheet 40.

In the present embodiment, the plurality of electrical steel sheets forming the rotor core 31 are fixed to each other by a fastener 42 (dowel) illustrated in FIG. 1. However, the plurality of electrical steel sheets forming the rotor core 31 may also have a laminated structure fixed by the first insulation coating 3A and the second insulation coating 3B similarly to the stator core 21.

Also, the laminated core such as the stator core 21 and the rotor core 31 may be formed by so-called rotating lamination.

(Laminated Core Manufacturing Method)

Next, a laminated core manufacturing method (hereinafter, also simply referred to as a manufacturing method) for manufacturing the stator core 21 will be described.

FIG. 6 illustrates a side view of a laminated core manufacturing device 100 (hereinafter, simply referred to as a manufacturing device 100) preferably used in the present manufacturing method.

In the manufacturing device 100, while the material 1 is sent from the coil 1A (hoop) in an arrow F direction, the material 1 is punched a plurality of times by a mold disposed at each stage to be gradually formed into a shape of the electrical steel sheet 40

Then, the punched electrical steel sheet 40 is laminated on the plurality of electrical steel sheets 40 that have already been laminated, and then pressurized while a temperature is raised. When the electrical steel sheets 40 are laminated, vertical orientations of the first insulation coating 3A and the second insulation coating 3B are the same. That is, the first insulation coating 3A is disposed on the upper surface of each electrical steel sheet 40, and the second insulation coating 3B is disposed on the lower surface thereof.

Then, the first insulation coating 3A on an upper surface of the electrical steel sheet 40 positioned relatively downward and the second insulation coating 3B on a lower surface of the other electrical steel sheet 40 that overlaps a top of the above-described electrical steel sheet 40 overlap each other and adhere (or fuse). At this time, although the second insulation coating 3B is hard and an adhesive strength is relatively weak, the first insulation coating 3A is soft, and thus a high adhesive strength can be exhibited. Therefore, since a necessary and sufficient adhesive strength between the electrical steel sheets 40 is kept, rigidity of the laminated core can be increased. On the other hand, since the second insulation coating 3B is hard, dusting due to punching and conveying, and scratches due to slit processing are unlikely to occur. Therefore, since time and effort such as removing dusting can be saved, productivity can be enhanced.

As described above, the electrical steel sheets 40 adjacent to each other in the lamination direction are adhered (fused) by the first insulation coating 3A and the second insulation coating 3B.

As illustrated in FIG. 6, the manufacturing device 100 includes a plurality of stages of punching stations. The punching station may be in two stages or three or more stages.

As a description for a case in which there are three stages of punching station as an example, the manufacturing device 100 includes a first stage punching station 110 at a position closest to the coil 1A, a second stage punching station 120 disposed adjacent to the punching station 110 on a downstream side in a conveying direction of the material 1, and a third stage punching station 130 disposed adjacent to the punching station 120 on a downstream side in the conveying direction of the material 1.

The punching station 110 includes a female mold 111 disposed below the material 1 and a male mold 112 disposed above the material 1.

The punching station 120 includes a female mold 121 disposed below the material 1 and a male mold 122 disposed above the material 1.

The punching station 130 includes a female mold 131 disposed below the material 1 and a male mold 132 disposed above the material 1.

The manufacturing device 100 further includes a laminating station 140 at a position downstream of the second stage punching station 120. The laminating station 140 includes a heating device 141, an outer circumferential punching female mold 142, a heat insulating member 143, an outer circumferential punching male mold 144, and a spring 145.

The heating device 141, the outer circumferential punching female mold 142, and the heat insulating member 143 are disposed below the material 1. On the other hand, the outer circumferential punching male mold 144 and the spring 145 are disposed above the material 1. Reference sign 21 indicates a stator core.

Further, in the present example, in addition to lamination of the electrical steel sheets 40, pressurizing and heating are also performed to adhere the electrical steel sheets 40, but the present invention is not limited only to the device and method of the present example. For example, lamination of the electrical steel sheets 40 may be performed in the manufacturing device 100, and the adhesion between the electrical steel sheets 40 may be performed in a subsequent process by another device. In this case, the heating device 141 and the heat insulating member 143 are unnecessary in the manufacturing device 100, and are installed in another device. In this case, before the stator core 21 in a non-adhesion state is moved from the manufacturing device 100 to another device, it is preferable to fix between the electrical steel sheets 40 with a jig (not illustrated) to prevent a positional deviation between the electrical steel sheets 40.

Figure 7:
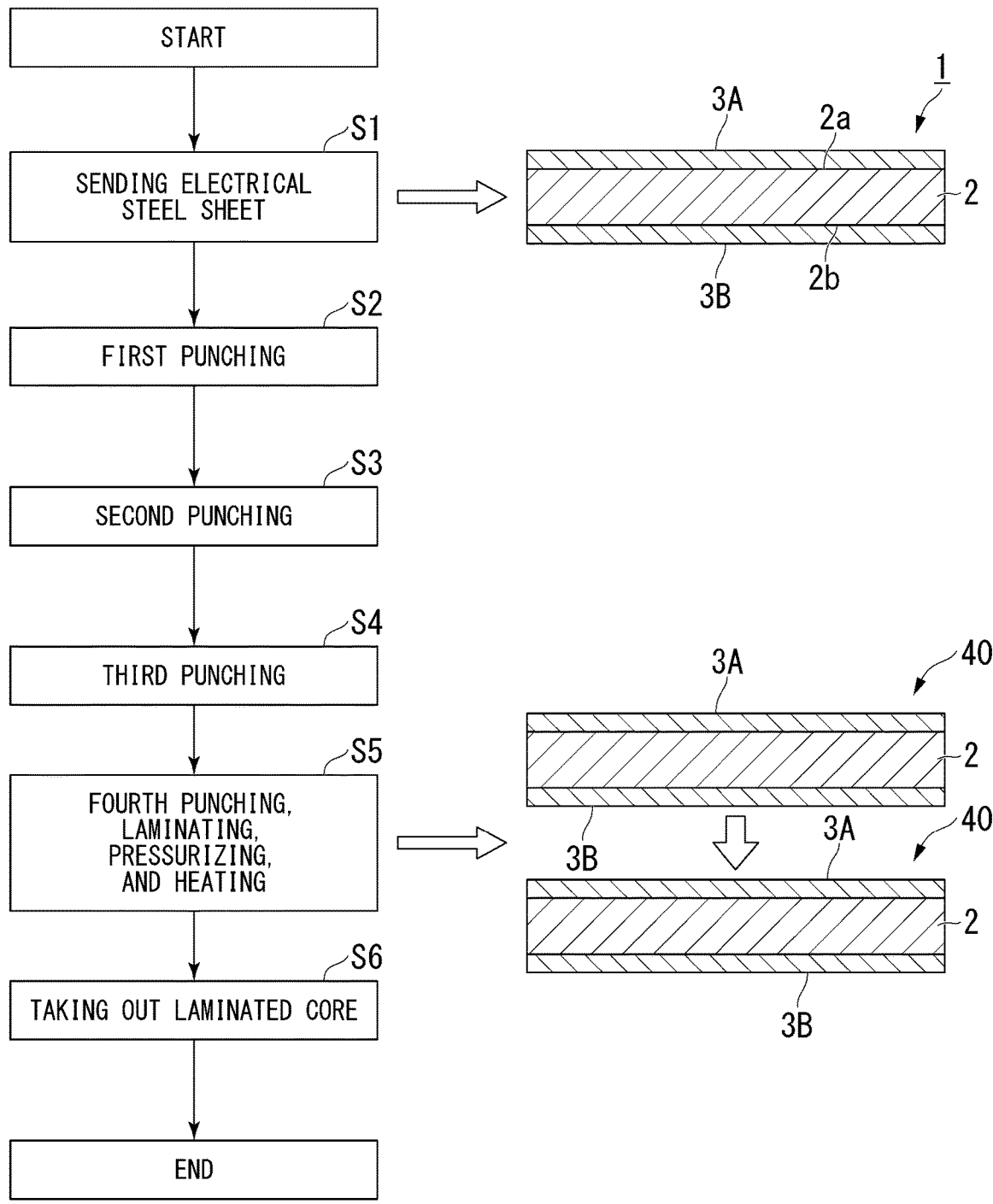
FIG. 7 is a flowchart showing an example of a laminated core manufacturing method using the manufacturing device.

The laminated core manufacturing method using the manufacturing device 100 having the above-described configuration will be described with reference to the flow chart shown in FIG. 7. The laminated core manufacturing method of the present embodiment includes a steel sheet sending step S1, a first punching step S2, a second punching step S3, a third punching step S4, a laminating step S5, and a take-out step S6.

In the steel sheet sending step S1, first, the material (electrical steel sheet) 1 is sequentially sent from the coil 1A in the arrow F direction of FIG. 6.

In the first punching step S2 following the steel sheet sending step S1, punching processing by the punching station 110 is performed with respect to the material 1.

In the second punching step S3 following the first punching step S2, punching processing by the punching station 120 is performed with respect to the material 1.

In the third punching step S4 following the second punching step S3, punching processing by the punching station 130 is performed with respect to the material 1.

When the punching processing by the first punching step S2 to the third punching step S4 is sequentially performed, a shape substantially similar to that of the electrical steel sheet 40 having the core back part 22 and the plurality of tooth parts 23 illustrated in FIG. 3 is obtained with respect to the material 1 except for an outermost shape of the core back part 22. However, since it is not completely punched out at this point, the processing proceeds to the next step in the arrow F direction.

The material 1 that has ended the third punching step S4 is sent to the laminating station 140, and the laminating step S5 is performed. In this laminating step S5, the material 1 is punched out by the outer circumferential punching male mold 144 to become the electrical steel sheet 40, and is accurately laminated on another electrical steel sheet 40 which has been punched out and laminated previously. At the time of the lamination, the electrical steel sheet 40 receives a constant pressing strength due to the spring 145. The punching step and the laminating step as described above are sequentially repeated, and thereby a predetermined number of electrical steel sheets 40 can be laminated. Further, the laminated core formed by laminating the electrical steel sheets 40 in this way is heated to, for example, a temperature of 200° C. by the heating device 141. The first insulation coating 3A and the second insulation coating 3B are cured by the heating, and the electrical steel sheets 40 are adhered to each other.

The stator core 21 is completed by the steps described above. In the take-out step S6 after the laminating step S5, the completed stator core 21 is taken out from the outer circumferential punching female mold 142, and thereby all the steps of the laminated core manufacturing method end.

Although a case in which the stator 21 is manufactured has been illustrated in each of the steps described above, the rotor core 31 may also be manufactured in the same process as the stator core 21.

As described above, the laminated core manufacturing method of the present embodiment includes the punching steps (the first punching step S2, the second punching step S3, and the third punching step S4) of obtaining the plurality of electrical steel sheets 40 by punching the material 1 while intermittently conveying the material 1 in the conveying direction F, and the laminating step S5 of punching and laminating each electrical steel sheet 40. The material 1 includes the base steel sheet 2, the first insulation coating 3A formed on the first surface 2a which is an upper surface of the base steel sheet 2, and the second insulation coating 3B formed on the second surface 2b which is a lower surface of the base steel sheet 2. Then, in the punching step, the material 1 is conveyed with the second insulation coating 3B facing downward. Also, in the laminating step S5, each electrical steel sheet 40 is laminated so that the second insulation coating 3B of the electrical steel sheet 40 to be laminated later overlaps the first insulation coating 3A of the electrical steel sheet 40 laminated previously.

According to the laminated core manufacturing method, in the punching step described above, the material 1 is conveyed while the second insulation coating 3B having a relatively high average pencil hardness faces downward. A lower surface of the material 1 to be conveyed receives friction due to a contact with a conveyance mechanism (not illustrated) that sends the material 1. However, since the average pencil hardness of the second insulation coating 3B forming the lower surface is made higher than that of the first insulation coating 3A forming the upper surface, scratching and dusting can be suppressed.

In processing from the shipped electrical steel sheet to the coil 1A (hoop), the electrical steel sheet is subjected to slit processing. The purpose of slit processing is to obtain the coil 1A having a predetermined sheet width from the electrical steel sheet having a large width. In the slit processing, the electrical steel sheet is unwound from the shipped electrical steel sheet in a coil shape with a large width, divided into a plurality of sections by being continuously cut by a rotating disc-shaped blade disposed on a downstream side thereof, and then wound as a plurality of coils 1A. At this time, in order to secure an accuracy of a sheet width of the coil 1A, it is necessary to apply tension to the electrical steel sheet, and the electrical steel sheet is pressed by the pad. Therefore, front and back surfaces of the electrical steel sheet are rubbed. However, in the electrical steel sheet of the present embodiment, since the average pencil hardness of the insulation coating formed on the base steel sheet satisfies the above-described predetermined conditions, scratches and peeling are suppressed.

EXAMPLES

First Example

Using the manufacturing device 100 illustrated in FIG. 6, the stator core 21 (hereinafter referred to as a stator core) was manufactured with a non-grain-oriented electrical steel sheet having a sheet thickness of 0.25 mm while changing various manufacturing conditions, and an adhesive strength and a degree of damage to the coating of the stator core were evaluated. More specifically, an average pencil hardness was adjusted for each of the first insulation coating 3A (front surface) and the second insulation coating 3B (back surface) by changing a combination or an equivalent ratio of the main agent and the curing agent. The results are summarized in Tables 1 to 3. Further, heating conditions of the stator core were all set to be the same, a heating temperature was 200° C., and a heating time was 30 minutes.

As illustrated in Tables 1 to 3, in No. 1 and 2, a composition of the curing agent was changed between the first insulation coating 3A and the second insulation coating 3B under the same baking condition.

Also, in No. 3 to 12 and 14 to 18, not only compositions of the main agent and the curing agent but also the baking condition were changed between the first insulation coating 3A and the second insulation coating 3B.

Also, in No. 13, both the composition of the curing agent and the baking condition were set to be the same between the first insulation coating 3A and the second insulation coating 3B.

TABLE 1

First insulation coating 3A (front surface)

| No. | — | Component name | Equivalent ratio | Average pencil hardness |
|---|---|---|---|---|
| 1 | Main agent | Bisphenol A type epoxy resin | 0.6 | HB |
|   | Curing agent | Phenol novolac resin | | |
| 2 | Main agent | Bisphenol A type epoxy resin | 0.8 | 2H |
|   | Curing agent | Aromatic polyamine | | |
| 3 | Main agent | Phenol novolac type epoxy resin | 0.8 | 2H |
|   | Curing agent | Bisphenol novolac resin | | |
| 4 | Main agent | Acrylic modified epoxy resin | 0.6 | HB |
|   | Curing agent | Triazine-modified phenol novolak resin | | |
| 5 | Main agent | Bisphenol A type epoxy resin | 0.6 | H |
|   | Curing agent | Dicyandiamide | | |
| 6 | Main agent | Phenol-based resin Acrylic modified epoxy resin | 0.9 | 2H |
|   | Curing agent | Diaminodiphenyl methane | | |
| 7 | Main agent | Bisphenol A type epoxy resin | 0.8 | 3H |
|   | Curing agent | Phenol resol resin | | |
| 8 | Main agent | Bisphenol A type epoxy resin | 0.9 | 2H |
|   | Curing agent | Bisphenol novolak resin | | |

TABLE 1-continued

First insulation coating 3A (front surface)

| No. | — | Component name | Equivalent ratio | Average pencil hardness |
|---|---|---|---|---|
| 9 | Main agent | Bisphenol A type epoxy resin | 0.7 | 2H |
|   | Curing agent | Phenol novolak resin Bisphenol novolak resin | | |
| 10 | Main agent | Phenol novolac type epoxy resin | 0.7 | 2H |
|   | Curing agent | Phenol novolak resin | | |
| 11 | Main agent | Bisphenol A type epoxy resin | 0.7 | 2H |
|   | Curing agent | Aromatic polyamine | | |
| 12 | Main agent | Bisphenol F type epoxy resin Bisphenol A type epoxy resin | 0.7 | 2H |
|   | Curing agent | Dicyandiamide | | |
| 13 | Main agent | Bisphenol A type epoxy resin | 1.0 | B |
|   | Curing agent | Phenol novolak resin | | |
| 14 | Main agent | Bisphenol A type epoxy resin | 1.0 | 4H |
|   | Curing agent | Cresol novolac resin | | |
| 15 | Main agent | Acrylic modified epoxy resin | 1.0 | B |
|   | Curing agent | Bisphenol novolak resin | | |
| 16 | Main agent | Bisphenol A type epoxy resin | 1.0 | 4H |
|   | Curing agent | Bisphenol novolak resin | | |
| 17 | Main agent | Acrylic resin Isocyanurate type epoxy resin | 1.0 | 4H |
|   | Curing agent | Triazine-modified phenol novolak resin | | |
| 18 | Main agent | Acrylic resin Phenol novolac type epoxy resin | 1.0 | H |
|   | Curing agent | Phenol novolak resin | | |

TABLE 2

Second insulation coating 3B (back surface)

| No. | — | Component name | Equivalent ratio | Average pencil hardness |
|---|---|---|---|---|
| 1 | Main agent | Bisphenol A type epoxy resin | 1.0 | H |
|   | Curing agent | Phenol novolac resin | | |
| 2 | Main agent | Bisphenol A type epoxy resin | 1.0 | 4H |
|   | Curing agent | Aromatic polyamine | | |
| 3 | Main agent | Bisphenol A type epoxy resin | 1.0 | 8H |
|   | Curing agent | Phenol novolac resin | | |
| 4 | Main agent | Acrylic modified epoxy resin | 1.0 | H |
|   | Curing agent | Phenol resol resin | | |
| 5 | Main agent | Bisphenol A type epoxy resin | 1.0 | 2H |
|   | Curing agent | Boron trifluoride-amine complex | | |
| 6 | Main agent | Bisphenol A type epoxy resin | 1.0 | 5H |
|   | Curing agent | Triazine-modified phenol novolak resin | | |
| 7 | Main agent | Acrylic modified epoxy resin | 0.9 | 6H |
|   | Curing agent | Triazine-modified phenol novolak resin | | |
| 8 | Main agent | Bisphenol A type epoxy resin | 1.0 | 4H |
|   | Curing agent | Dicyandiamide | | |
| 9 | Main agent | Bisphenol A type epoxy resin | 1.0 | 4H |
|   | Curing agent | Aromatic polyamine | | |
| 10 | Main agent | Bisphenol A type epoxy resin | 0.9 | 6H |
|    | Curing agent | Phenol resol resin | | |
| 11 | Main agent | Acrylic modified epoxy resin | 0.9 | 8H |
|    | Curing agent | Phenol resol resin | | |
| 12 | Main agent | Acrylic resin Glycidyl ester type epoxy resin | 1.0 | 4H |
|    | Curing agent | Bisphenol novolak resin Phenol novolak resin | | |
| 13 | Main agent | Bisphenol A type epoxy resin | 1.0 | B |
|    | Curing agent | Phenol novolak resin | | |
| 14 | Main agent | Bisphenol A type epoxy resin | 0.9 | 4H |
|    | Curing agent | Triazine-modified phenol novolak resin | | |
| 15 | Main agent | Bisphenol A type epoxy resin | 0.9 | 2H |
|    | Curing agent | Aromatic polyamine | | |

TABLE 2-continued

| | | Second insulation coating 3B (back surface) | | |
|---|---|---|---|---|
| No. | — | Component name | Equivalent ratio | Average pencil hardness |
| 16 | Main agent | Acrylic modified epoxy resin | 0.9 | 6H |
| | Curing agent | Triazine-modified phenol novolak resin | | |
| 17 | Main agent | Acrylic resin | 0.5 | B |
| | | Cresol novolak type epoxy resin | | |
| | Curing agent | Phenol novolak resin | | |
| 18 | Main agent | Cresol novolak type epoxy resin | 1.0 | B |
| | Curing agent | Phenol resol resin | | | line for them to be rubbed against each other, and a degree of damage to the first insulation coating 3A and the second insulation coating 3B at that time was visually ascertained. Then, degrees of damage were determined as "bad," "acceptable," "satisfactory," and "excellent."

The above results are shown in Table 3. The degree of damage to the coating was determined for both the first insulation coating 3A (front surface) and the second insulation coating 3B (back surface).

As a result, in No. 1 to 12 which were examples of the invention and had a relative ratio (ratio of equivalent ratio) of 0.60 or more and 0.95 or less, both the adhesive strength and the degree of damage to the coating were evaluated as satisfactory or better. Among them, in No. 2 and No. 6 to 12 in which the average pencil hardness of the second insula-

TABLE 3

| No. | Relative ratio (ratio of equivalent ratio) (-) | Evaluation of relative ratio | Adhesive strength (N) | Determination | Degree of damage to coating Surface | Back surface | Invention example/comparative example | Remark |
|---|---|---|---|---|---|---|---|---|
| 1 | 0.60 | Satisfactory | 1470 | Satisfactory | Acceptable | Satisfactory | Invention example | |
| 2 | 0.80 | Excellent | 1492 | Satisfactory | Excellent | Excellent | Invention example | |
| 3 | 0.80 | Excellent | 1481 | Satisfactory | Excellent | Excellent | Invention example | |
| 4 | 0.60 | Satisfactory | 1491 | Satisfactory | Acceptable | Satisfactory | Invention example | |
| 5 | 0.60 | Satisfactory | 1503 | Satisfactory | Satisfactory | Excellent | Invention example | |
| 6 | 0.90 | Excellent | 1509 | Satisfactory | Excellent | Excellent | Invention example | |
| 7 | 0.89 | Excellent | 1499 | Satisfactory | Excellent | Excellent | Invention example | |
| 8 | 0.90 | Excellent | 1512 | Satisfactory | Excellent | Excellent | Invention example | |
| 9 | 0.70 | Excellent | 1488 | Satisfactory | Excellent | Excellent | Invention example | |
| 10 | 0.78 | Excellent | 1499 | Satisfactory | Excellent | Excellent | Invention example | |
| 11 | 0.78 | Excellent | 1477 | Satisfactory | Excellent | Excellent | Invention example | |
| 12 | 0.70 | Excellent | 1498 | Satisfactory | Excellent | Excellent | Invention example | |
| 13 | 1.00 | Bad | 1491 | Satisfactory | Bad | Bad | Comparative example | Low hardness on both front and back surfaces |
| 14 | 1.11 | Bad | 975 | Bad | Excellent | Excellent | Comparative example | High hardness on front surface |
| 15 | 1.11 | Bad | 1483 | Satisfactory | Bad | Excellent | Comparative example | Low hardness on front surface |
| 16 | 1.11 | Bad | 968 | Bad | Excellent | Excellent | Comparative example | High hardness on front surface |
| 17 | 2.00 | Bad | 1258 | Acceptable | Excellent | Bad | Comparative example | Lower hardness on back surface |
| 18 | 1.00 | Bad | 1452 | Satisfactory | Satisfactory | Bad | Comparative example | Lower hardness on back surface |

The stator cores in which those combinations of the first insulation coating 3A and the second insulation coating 3B were formed were manufactured, and adhesive strengths and degrees of coating damage of them were measured.

For the adhesive strength, when a wedge was pushed into a central portion of the laminated surface, a maximum load at the time of a space between the laminated surfaces being opened and an iron core being separated was measured. Here, a wedge having a distal end angle of 7 degrees was used. Then, the wedge was pushed into a central height position of the stator core in the lamination direction.

In Table 3, a rigidity of the stator core increases as a value of the adhesive strength becomes high, and this is preferable. In Table 3, criteria for determining the adhesive strength were such that a case of less than 980 N was evaluated as "bad," a case of 980 N or more and 1450 N or less was evaluated as "acceptable," and a case of more than 1450 N was evaluated as "satisfactory."

For the degree of damage to the coating, the material 1 was pressed against a steel sheet support roll of the factory tion coating 3B satisfied 4 H or higher and 9 H or lower, excellent results were obtained in which the adhesive strength was satisfactory and the degree of damage to the coating was "excellent" on both the front and back surfaces.

On the other hand, in No. 13 which is a comparative example, since the average pencil hardness was low on both the front and back surfaces, the degree of damage to the coating on the front and back surfaces was determined to be bad.

Also, in No. 14 which is a comparative example, since the average pencil hardness on the front surface was high, the adhesive strength on the front surface was determined to be bad.

Also, in No. 15 which is a comparative example, since the average pencil hardness on the front surface was low, the degree of damage to the coating on the front surface was determined to be bad.

Also, in No. 16 which is a comparative example, since the average pencil hardness on the front surface was high, the adhesive strength on the front surface was determined to be bad.

Also, in No. 17 which is a comparative example, since the average pencil hardness on the back surface was lower than that on the front surface, the degree of damage to the coating on the back surface was determined to be bad.

Similarly, also in No. 18 which is a comparative example, since the average pencil hardness on the back surface was lower than that on the front surface, the degree of damage to the coating on the back surface was determined to be bad.

Second Example

Using the manufacturing device 100 illustrated in FIG. 6, the stator core 21 (hereinafter referred to as a stator core) was manufactured while changing various manufacturing conditions for a non-grain-oriented electrical steel sheet having a sheet thickness of 0.25 mm. Then, an adhesive strength and a degree of damage to the coating of the stator core were evaluated. The results are shown in Table 4.

TABLE 4

| | First insulation coating 3A (front surface) | | | Second insulation coating 3B (back surface) | | | Adhesive strength | | Degree of damage to coating | | Invention example/ | |
|---|---|---|---|---|---|---|---|---|---|---|---|---|
| No. | Baking temperature (°C.) | Baking time (min) | Average pencil hardness | Baking temperature (°C.) | Baking time (min) | Average pencil hardness | (N) | Determination | Front surface | Back surface | comparative | Remark |
| 19 | 100 | 5 | 2H | 150 | 10 | 4H | 1491 | Satisfactory | Excellent | Excellent | Invention example | — |
| 20 | 100 | 5 | 2H | 190 | 10 | 8H | 1482 | Satisfactory | Excellent | Excellent | Invention example | — |
| 21 | 100 | 5 | 2H | 160 | 10 | 5H | 1508 | Satisfactory | Excellent | Excellent | Invention example | — |
| 22 | 100 | 5 | 2H | 190 | 5 | 6H | 1498 | Satisfactory | Excellent | Excellent | Invention example | — |
| 23 | 150 | 10 | 4H | 190 | 5 | 6H | 975 | Bad | Excellent | Excellent | Comparative example | In first insulation coating 3A, baking time was long and baking temperature also was high. Therefore, average pencil hardness was higher than 3H and required adhesive strength could not be obtained |
| 24 | 110 | 1 | B | 100 | 0.5 | 2B | 1483 | Satisfactory | Bad | Bad | Comparative example | Second insulation coating 3B had shorter baking time and lower-baking temperature than first insulation coating 3A. Therefore, average pencil hardness of second insulation coating 3B was lower than pencil hardness of first insulation coating 3A, and |

TABLE 4-continued

| | First insulation coating 3A (front surface) | | | Second insulation coating 3B (back surface) | | | | | Degree of damage to coating | | Invention example | |
|---|---|---|---|---|---|---|---|---|---|---|---|---|
| No. | Baking temperature (° C.) | Baking time (min) | Average pencil hardness | Baking temperature (° C.) | Baking time (min) | Average pencil hardness | Adhesive strength (N) | Determination | Front surface | Back surface | example/ comparative | Remark |
| | | | | | | | | | | | | required scratch prevention ability could not be obtained. In addition, since baking time of first insulation coating 3A was short, resistance to slitting was also low. |

Here, as components of the insulation coating of the material 1 used in the manufacture, a bisphenol A type epoxy resin was used for the main agent, and a phenol resol resin was used for the curing agent as the first insulation coating 3A (front surface) in all cases. Also, as the second insulation coating 3B (back surface), a bisphenol A type epoxy resin was used for the main agent, and a phenol novolac resin was used for the curing agent.

Also, the equivalent ratio was 1.0 in all cases. After the component conditions and equivalent ratio conditions were all prepared in this way, a baking temperature and a baking time for forming the first insulation coating 3A and the second insulation coating 3B were changed for each case. Further, of the first insulation coating 3A and the second insulation coating 3B, the pencil hardness of the insulation coating formed previously may change due to the baking temperature and baking time of the insulation coating formed later. In the second example, for the purpose of eliminating such an influence, an insulation coating was first formed with favorable test conditions for obtaining high pencil hardness such as a high baking temperature condition or a long baking time condition among the baking conditions set for each of the first insulation coating 3A and the second insulation coating 3B, and then the other insulation coating was formed. Then, the adhesive strength and the degree of damage to the coating were evaluated by the same method as in the first example.

As a result, No. 19 to 22 which are examples of the invention achieve high adhesiveness, high resistance to slitting, and scratch prevention ability at the same time.

On the other hand, in No. 23, the baking time of the first insulation coating 3A was long and the baking temperature was also high. Therefore, the average pencil hardness of the first insulation coating 3A was higher than 3 H, and the required adhesive strength could not be obtained.

Also, in No. 24 which was a comparative example, the second insulation coating 3B had shorter baking time and lower baking temperature than those of the first insulation coating 3A. Therefore, the average pencil hardness of the second insulation coating 3B was lower than the pencil hardness of the first insulation coating 3A, and the required scratch prevention ability could not be obtained. In addition, since the baking time of the first insulation coating 3A was short, the resistance to slitting was also low.

While one embodiment and examples of the present invention have been described in detail above with reference to the drawings, the specific configurations are not limited only to the configurations of these embodiment and examples, and include changes, combinations, deletions, or the like of the configurations within a range not departing from the gist of the present invention.

For example, a shape of the stator core 21 is not limited only to the form illustrated in the above-described embodiment. Specifically, dimensions of the outer diameter and inner diameter, a laminated thickness, and the number of slots of the stator core 21, a dimensional ratio of the tooth part 23 in the circumferential direction and the radial direction, a dimensional ratio in the radial direction between the tooth part 23 and the core back part 22, or the like can be arbitrarily designed according to desired characteristics of the rotary electric machine.

In the rotor 30 of the above-described embodiment, a set of two permanent magnets 32 forms one magnetic pole, but the present invention is not limited only to the form. For example, one permanent magnet 32 may form one magnetic pole, or three or more permanent magnets 32 may form one magnetic pole.

In the above-described embodiment, the permanent magnetic electric motor has been described as an example of the rotary electric machine 10, but the present invention is not limited thereto. For example, the rotary electric machine 10 may also be a reluctance motor or an electromagnet field motor (wound-field motor).

In the above-described embodiment, the synchronous motor has been described as an example of the AC motor, but the present invention is not limited thereto. For example, the rotary electric machine 10 may also be an induction motor.

In the above-described embodiment, the AC motor has been described as an example of the rotary electric machine 10, but the present invention is not limited thereto. For example, the rotary electric machine 10 may be a DC motor.

In the above-described embodiment, the electric motor has been described as an example of the rotary electric machine 10, but the present invention is not limited thereto. For example, the rotary electric machine 10 may be a generator.

INDUSTRIAL APPLICABILITY

According to the above-described aspects of the present invention, it is possible to provide an electrical steel sheet in which both high adhesiveness, and high resistance to slitting and scratch prevention ability can be achieved, a laminated core formed by laminating a plurality of these electrical steel sheets, and a laminated core manufacturing method for manufacturing the laminated core. Therefore, industrial applicability is high.

BRIEF DESCRIPTION OF THE REFERENCE SYMBOLS

1 Material (electrical steel sheet)
2 Base steel sheet
3A First insulation coating
3B Second insulation coating
21 Stator core (laminated core)
22 Core back part
23 Tooth part
31 Rotor core (laminated core)
40 Electrical steel sheet

The invention claimed is:

1. An electrical steel sheet comprising:
 a base steel sheet;
 a first insulation coating formed on a first surface of the base steel sheet and having adhesiveness; and
 a second insulation coating formed on a second surface of the base steel sheet which is a back surface to the first surface and having adhesiveness, wherein
 an average pencil hardness of the first insulation coating is H or higher and 3H or lower, and
 an average pencil hardness of the second insulation coating is higher than the average pencil hardness of the first insulation coating.

2. The electrical steel sheet according to claim 1, wherein the average pencil hardness of the second insulation coating is 4H or higher and 9H or lower.

3. The electrical steel sheet according to claim 2, wherein
 the first insulation coating and the second insulation coating both contain the same main agent and the same curing agent, and
 when an equivalent ratio of the curing agent to the main agent in the first insulation coating is a and an equivalent ratio of the curing agent to the main agent in the second insulation coating is b, a relative ratio expressed by a/b is 0.60 or more and 0.95 or less.

4. The electrical steel sheet according to claim 1, wherein
 the first insulation coating and the second insulation coating both contain the same main agent and the same curing agent, and
 when an equivalent ratio of the curing agent to the main agent in the first insulation coating is a and an equivalent ratio of the curing agent to the main agent in the second insulation coating is b, a relative ratio expressed by a/b is 0.60 or more and 0.95 or less.

5. A laminated core formed by laminating two or more electrical steel sheets according to claim 1.

6. A laminated core formed by laminating two or more electrical steel sheets according to claim 2.

7. A laminated core formed by laminating two or more electrical steel sheets according to claim 3.

8. A laminated core formed by laminating two or more electrical steel sheets according to claim 4.

9. A laminated core manufacturing method comprising:
 a punching step of obtaining a plurality of electrical steel sheets according to claim 1 by punching a material while intermittently conveying the material in a conveying direction; and
 a laminating step of laminating each of the electrical steel sheets, wherein
 the material includes:
 the base steel sheet;
 the first insulation coating formed on an upper surface of the base steel sheet; and
 the second insulation coating formed on a lower surface of the base steel sheet,
 the material is conveyed with the second insulation coating facing downward in the punching step, and
 each electrical steel sheet is laminated so that the second insulation coating of the electrical steel sheet to be laminated later overlaps the first insulation coating of the electrical steel sheet laminated previously in the laminating step.

10. A laminated core manufacturing method comprising:
 a punching step of obtaining a plurality of electrical steel sheets according to claim 2 by punching a material while intermittently conveying the material in a conveying direction; and
 a laminating step of laminating each of the electrical steel sheets, wherein
 the material includes:
 the base steel sheet;
 the first insulation coating formed on an upper surface of the base steel sheet; and
 the second insulation coating formed on a lower surface of the base steel sheet,
 the material is conveyed with the second insulation coating facing downward in the punching step, and
 each electrical steel sheet is laminated so that the second insulation coating of the electrical steel sheet to be laminated later overlaps the first insulation coating of the electrical steel sheet laminated previously in the laminating step.

11. A laminated core manufacturing method comprising:
 a punching step of obtaining a plurality of electrical steel sheets according to claim 3 by punching a material while intermittently conveying the material in a conveying direction; and
 a laminating step of laminating each of the electrical steel sheets, wherein
 the material includes:
 the base steel sheet;
 the first insulation coating formed on an upper surface of the base steel sheet; and
 the second insulation coating formed on a lower surface of the base steel sheet,
 the material is conveyed with the second insulation coating facing downward in the punching step, and
 each electrical steel sheet is laminated so that the second insulation coating of the electrical steel sheet to be laminated later overlaps the first insulation coating of the electrical steel sheet laminated previously in the laminating step.

12. A laminated core manufacturing method comprising:

a punching step of obtaining a plurality of electrical steel sheets according to claim 4 by punching a material while intermittently conveying the material in a conveying direction; and a laminating step of laminating each of the electrical steel sheets, wherein the material includes:

the base steel sheet;

the first insulation coating formed on an upper surface of the base steel sheet; and the second insulation coating formed on a lower surface of the base steel sheet, the material is conveyed with the second insulation coating facing downward in the punching step, and each electrical steel sheet is laminated so that the second insulation coating of the electrical steel sheet to be laminated later overlaps the first insulation coating of the electrical steel sheet laminated previously in the laminating step.

\* \* \* \* \*